(12) United States Patent
Miyamoto et al.

(10) Patent No.: US 10,301,713 B2
(45) Date of Patent: May 28, 2019

(54) THERMAL SPRAY POWDER, METHOD OF FORMING ABRADABLE THERMAL SPRAY COATING USING THE SAME, AND ABRADABLE THERMAL SPRAY COATING

(71) Applicant: TOYOTA JIDOSHA KABUSHIKI KAISHA, Toyota-shi, Aichi-ken (JP)

(72) Inventors: Noritaka Miyamoto, Toyota (JP);
Masahiro Kurase, Matsuyama (JP);
Toshio Hotta, Matsuyama (JP);
Mototsugu Koyama, Matsuyama (JP);
Eisuke Yamamoto, Matsuyama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/471,488

(22) Filed: Mar. 28, 2017

(65) Prior Publication Data
US 2017/0283932 A1 Oct. 5, 2017

(30) Foreign Application Priority Data
Mar. 31, 2016 (JP) ................. 2016-071773

(51) Int. Cl.
| | | |
|---|---|---|
| *C23C 4/129* | (2016.01) | |
| *C09D 1/02* | (2006.01) | |
| *C23C 4/04* | (2006.01) | |
| *C09D 1/00* | (2006.01) | |
| *C23C 4/06* | (2016.01) | |

(52) U.S. Cl.
CPC ............ *C23C 4/129* (2016.01); *C09D 1/00* (2013.01); *C09D 1/02* (2013.01); *C23C 4/04* (2013.01); *C23C 4/06* (2013.01)

(58) Field of Classification Search
None
See application file for complete search history.

(56) References Cited

U.S. PATENT DOCUMENTS

| | | |
|---|---|---|
| 6,887,530 B2 | 5/2005 | Fiala et al. |
| 2007/0248457 A1 | 10/2007 | Dodd et al. |
| 2008/0145649 A1 * | 6/2008 | Mannem .............. C10M 111/00 428/336 |

FOREIGN PATENT DOCUMENTS

| | | | |
|---|---|---|---|
| JP | H04-76225 A | 3/1992 | |
| JP | 10-140318 A | 5/1998 | |
| JP | 2008-111425 A | 5/2008 | |
| WO | WO-0144533 A1 * | 6/2001 | ............... C23C 4/06 |

OTHER PUBLICATIONS

Partial Translation of Notification of Reason(s) for Refusal dated Sep. 4, 2018 from the Japanese Patent Office in counterpart application No. 2016-071773.
Hirao, M., "Synthetic Mica", Cray Science, Nov. 20, 1983, vol. 23, No. 3, pp. 87-91.

* cited by examiner

*Primary Examiner* — Alexandre F Ferre
(74) *Attorney, Agent, or Firm* — Sughrue Mion, PLLC

(57) ABSTRACT

There is provided a thermal spray powder for forming an abradable thermal spray coating. The thermal spray powder includes NiCr alloy particles and synthetic mica particles. The synthetic mica particles are contained at 40 volume % or less with respect to a total volume of the thermal spray powder.

13 Claims, 10 Drawing Sheets

THERMAL SPRAY POWDER, METHOD OF FORMING ABRADABLE THERMAL SPRAY COATING USING THE SAME, AND ABRADABLE THERMAL SPRAY COATING

INCORPORATION BY REFERENCE

The disclosure of Japanese Patent Application No. 2016-071773 filed on Mar. 31, 2016 including the specification, drawings and abstract is incorporated herein by reference in its entirety.

BACKGROUND

1. Technical Field

The present disclosure relates to a thermal spray powder used for forming a thermal spray coating having abradability, a method of forming an abradable thermal spray coating using the same, and an abradable thermal spray coating.

2. Description of Related Art

In thermal spray coatings having abradability (abradable thermal spray coatings), materials having certain specifications have been used based on standards for aircraft engines and the like. Here, abradability is a characteristic in which a material is worn down itself to protect a mating member. In recent years, for example, in gas turbines and jet engines, abradable thermal spray coatings having heat resistance exceeding a heat resistance temperature of, for example, 500° C., have been developed.

For example, in Japanese Patent Application Publication No. 10-140318 (JP 10-140318 A), the following method of forming an abradable thermal spray coating is disclosed. In the forming method, first, a Ni-5Al or Ni-18.5Cr-6Al powder is plasma thermally sprayed onto a surface of a base material. Next, a powder obtained by mixing the following first powder and second powder is flame thermally sprayed onto the plasma thermally sprayed surface. The first powder includes Cr at 3 to 7 weight %, Al at 3 to 7 weight %, $Al_2O_3$ and $SiO_2$ at 6 to 14 weight %, and Ni at the remaining weight %. The second powder includes Cr at 3 to 7 weight %, Al at 3 to 7 weight %, $Al_2O_3$ and $SiO_2$ at 15 to 30 weight % and Ni at the remaining weight %.

SUMMARY

However, in the technique in JP 10-140318 A, when a mating member comes in contact with the formed abradable thermal spray coating, the mating member may adhere to the abradable thermal spray coating and adhesion wear of the mating member may occur.

The present disclosure has been made in view of the above problem and provides a thermal spray powder capable of suppressing adhesion wear of a mating member that comes in contact with an abradable thermal spray coating and a method of forming an abradable thermal spray coating using the same.

According to a first aspect of the present disclosure, there is provided a thermal spray powder for forming an abradable thermal spray coating. The powder includes NiCr alloy particles and synthetic mica particles. The synthetic mica particles are contained at 40 volume % or less with respect to the total volume of the thermal spray powder. According to the first aspect, when the synthetic mica particles remain in the abradable thermal spray coating, it is possible to suppress adhesion wear of the mating member that comes in contact with the abradable thermal spray coating.

In the first aspect, the synthetic mica particles may be contained at 20 volume % or more with respect to the total volume of the thermal spray powder. Thus, it is possible to further improve wear resistance of the mating member without containing h-BN particles to be described below.

In the first aspect, h-BN particles may be further included. The synthetic mica particles may be contained at 30 volume % or less with respect to the total volume of the thermal spray powder. The h-BN particles may be contained at 15 volume % or less with respect to the total volume of the thermal spray powder. Since h-BN is a material having solid lubricity like graphite, when the h-BN particles are contained in such a range, it is possible to further improve abradability of the thermal spray coating.

In the first aspect, h-BN particles may be further included. The synthetic mica particles may be contained at 20 volume % or less with respect to the total volume of the thermal spray powder. The h-BN particles may be contained at 20 volume % or less with respect to the total volume of the thermal spray powder. Since h-BN is a material having solid lubricity like graphite, when the h-BN particles are contained in such a range, it is possible to further improve abradability of the thermal spray coating.

In the first aspect, the synthetic mica particles may be particles made of fluorine phlogopite. When particles made of fluorine phlogopite are used as the synthetic mica particles, the synthetic mica particles do not easily melt when a thermal spray coating is formed. Therefore, it is possible to form the thermal spray coating under higher temperature conditions while some of the synthetic mica particles remain in a solid phase state.

In the first aspect, the NiCr alloy particles may contain Cr at 20 to 50 mass %. Thus, it is possible to improve oxidation resistance of the NiCr alloy particles.

In the first aspect, the NiCr alloy particles may contain Al at 0.1 to 5 mass %. Thus, it is possible to increase oxidation resistance of the NiCr alloy particles without excessively increasing the hardness of the NiCr alloy particles.

According to a second aspect of the present disclosure, there is provided a method of forming an abradable thermal spray coating using the thermal spray powder of the first aspect. The second aspect includes forming the abradable thermal spray coating while some of the synthetic mica particles contained in the thermal spray powder remain in a solid phase state.

In the second aspect, forming the abradable thermal spray coating using the thermal spray powder may be performed by gas flame thermal spraying. In a gas flame thermal spraying method, if a thermal spray powder is thermally sprayed, some of the synthetic mica particles easily remain in a solid phase state when the thermal spray coating is formed.

In the second aspect, at least one of conditions including (i) a supply flow rate of a combustion gas supplied to a thermal spray gun, (ii) an air pressure of air supplied to the thermal spray gun, (iii) a thermal spray distance between a base material on which the abradable thermal spray coating is formed and the thermal spray gun, and (iv) a supply rate of the thermal spray powder to the base material may be adjusted so that some of the synthetic mica particles remain in a solid phase.

According to a third aspect of the present disclosure, there is provided an abradable thermal spray coating that includes NiCr alloy particles and synthetic mica particles. The synthetic mica particles are contained at 40 volume % or less with respect to a total volume of powders contained in the abradable thermal spray coating.

In the third aspect, the synthetic mica particles may be contained at 20 volume % or more with respect to the total volume of powders contained in the abradable thermal spray coating. Thus, it is possible to further improve wear resistance of a mating member without containing h-BN particles to be described below.

In the third aspect, the synthetic mica particles may include shells on surfaces of the synthetic mica particles, the shells being formed by a solidification of melted synthetic mica particles.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment will be described below with reference to FIGS. 1 to 3

1. Thermal Spray Powder 10

Figure 1:
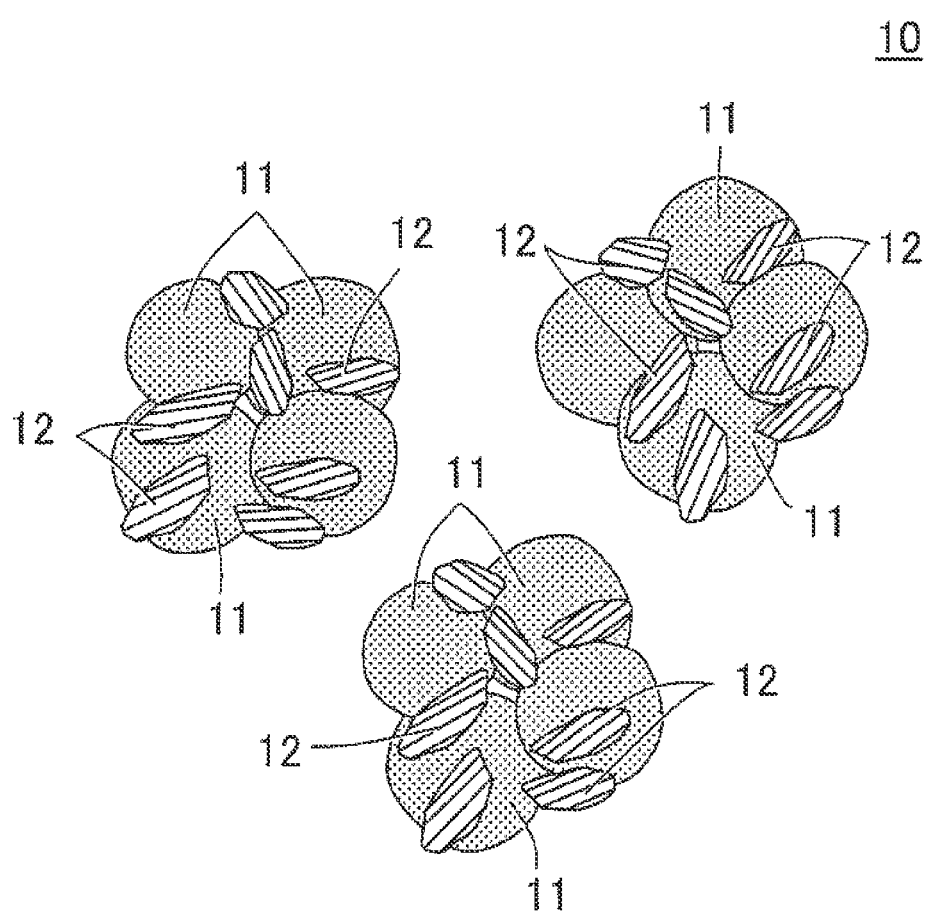
FIG. 1 is a schematic conceptual diagram of thermal spray powders according to an embodiment of the present disclosure.

FIG. 1 is a schematic conceptual diagram of a thermal spray powder 10 according to an embodiment. The thermal spray powder 10 according to the present embodiment is a thermal spray powder for forming an abradable thermal spray coating (hereinafter referred to as a thermal spray coating). Note that the abradable thermal spray coating is a thermal spray coating having abradability.

As shown in FIG. 1, the thermal spray powder 10 is a powder including NiCr alloy particles 11 and synthetic mica particles 12 and further includes h-BN particles (to be described below) as necessary. The thermal spray powder 10 is a powder including particles obtained by mixing a powder containing the NiCr alloy particles 11 and a powder containing the synthetic mica particles 12 and granulating them using a binding agent such as a resin.

The thermal spray powder 10 may be a powder in which the NiCr alloy particles 11 and the synthetic mica particles 12 are mixed as long as the NiCr alloy particles 11 and the synthetic mica particles 12 in a mixed state are able to be thermally sprayed onto a base material when the thermal spray powder 10 is thermally sprayed. In addition, the thermal spray powder 10 may be a powder that is compacted by a cladding method or the like rather than a granulated powder in which the NiCr alloy particles 11 and the synthetic mica particles 12 are granulated.

1-1. NiCr Alloy Particles 11

The NiCr alloy particles 11 are particles made of a NiCr alloy. A content of Cr is not particularly limited. However, in the NiCr alloy particles, Cr is preferably contained in a range of 20 to 50 mass % with respect to the whole mass of the particles. Thus, it is possible to improve oxidation resistance of the NiCr alloy particles.

The NiCr alloy particles 11 may further contain Al, Y, and the like. For example, when Al is added to the NiCr alloy particles 11, it is possible to improve oxidation resistance of the NiCr alloy particles 11 regardless of a content of Cr. In the NiCr alloy particles 11, Al is preferably contained at 0.1 to 5 mass % with respect to a mass of the whole particles. Thus, it is possible to increase oxidation resistance of the NiCr alloy particles without excessively increasing the hardness of the NiCr alloy particles 11.

In addition, as long as it is possible to form a thermal spray coating having a characteristic to be described below, the particle size of the NiCr alloy particle 11 is not particularly limited. However, the particle size of the NiCr alloy particle 11 is preferably, for example, in a range of 5 to 150 μm. Note that the "particle size" herein refers to a particle size that is measured by a laser diffraction type particle size distribution measurement method. Such a particle size can be obtained by the classification according to, for example, JISZ2510.

1-2. Synthetic Mica Particles 12

The synthetic mica particles 12 are particles made of artificially synthesized mica and are different from particles made of natural mica. In general, synthetic mica has a higher melting point than natural mica. The synthetic mica particles 12 are contained at 40 volume % or less with respect to a total volume of the thermal spray powder 10. When the synthetic mica particles 12 are contained at 40 volume % or less with respect to the total volume of the thermal spray powder 10, it is possible to ensure the strength of the formed thermal spray coating. When no h-BN particles are contained, the total volume of the thermal spray powder 10 is a total value of volumes of the NiCr alloy particles 11 and the synthetic mica particles 12.

On the other hand, when the synthetic mica particles 12 are contained at greater than 40 volume % with respect to the total volume of the thermal spray powder 10, as can be clearly understood from experiments conducted by the inventors to be described below, the strength of the thermal spray coating decreases and the thermal spray coating is peeled off from a base material when a mating member comes in contact with the thermal spray coating.

When the synthetic mica particles 12 are contained in the thermal spray powder 10, since machinability of the thermal spray coating and wear resistance of the mating member are improved, a lower limit value of an amount thereof is not particularly limited. The synthetic mica particles 12 are preferably contained at 20 volume % or more with respect to the total volume of the thermal spray powder 10. When the synthetic mica particles 12 are contained at 20 volume % or more with respect to the total volume of the thermal spray powder 10, it is possible to further improve wear resistance of the mating member without containing h-BN particles to be described below.

Note that the "volume %" herein refers to a volume percentage of a material of particles calculated using a specific gravity thereof from a mass of a material forming particles of a thermal spray powder. For example, when no h-BN particles are contained in a thermal spray powder, a total volume of the thermal spray powder is a total value of a volume of NiCr alloy particles calculated using a specific gravity thereof from a total mass of NiCr alloy particles and a volume of synthetic mica particles calculated using a specific gravity thereof from a total mass of synthetic mica particles. Volume percentages of NiCr alloy particles and synthetic mica particles can be obtained by dividing the calculated volumes of the particles by the total volume of the thermal spray powder.

As synthetic micas of the synthetic mica particles 12, synthetic micas, for example, fluorine phlogopite ($KMg_3AlSi_3O_{10}F_2$), K tetra silicic mica ($KMg_{2.5}Si_4O_{10}F_2$), Na tetra silicic mica ($NaMg_{2.5}Si_4O_{10}F_2$), Na teniolite ($NaMg_2LiSi_4O_{10}F_2$), and Li teniolite ($LiMg_2LiSi_4O_{10}F_2$), can be exemplified.

Among them, since fluorine phlogopite has a higher melting point than other materials, particles made of fluorine phlogopite are preferably used as the synthetic mica particles. When particles made of fluorine phlogopite are used as the synthetic mica particles 12, the synthetic mica particles 12 do not easily melt when a thermal spray coating is formed. Therefore, it is possible to form the thermal spray coating under higher temperature conditions while some of the synthetic mica particles 12 remain in a solid phase state.

In addition, as long as a thermal spray coating having a characteristic to be described below can be formed, the particle size of the synthetic mica particles 12 is not particularly limited, and the particle size of the synthetic mica particles 12 is preferably, for example, in a range of 5 to 150 μm.

1-3. h-BN Particles

The thermal spray powder 10 shown in FIG. 1 may further contain h-BN particles. The h-BN particles are particles made of a hexagonal boron nitride. When the thermal spray powder 10 is granulated, the h-BN particles may be bonded to the NiCr alloy particles 11 and the synthetic mica particles 12 using a binding agent.

The thermal spray powder 10 may be a powder in which the NiCr alloy particles 11, the synthetic mica particles 12, and the h-BN particles are mixed as long as thermal spraying can be performed on a base material while the h-BN particles are uniformly mixed together with the NiCr alloy particles 11 and the synthetic mica particles 12 when the thermal spray powder 10 is thermally sprayed. Alternatively, the thermal spray powder 10 may be a powder compacted by a cladding method or the like rather than a granulated powder in which the NiCr alloy particles 11, the synthetic mica particles 12, and the h-BN particles are granulated.

When the thermal spray powder 10 contains the h-BN particles, a total volume of the thermal spray powder 10 is a total value of volumes of the NiCr alloy particles 11, the synthetic mica particles 12, and the h-BN particles. When the synthetic mica particles 12 are assumed to be contained at 30 volume % or less with respect to the total volume of the thermal spray powder, the h-BN particles are preferably contained at 15 volume % or less with respect to the total volume of the thermal spray powder. In addition, when the synthetic mica particles 12 are assumed to be contained at 20 volume % or less with respect to the total volume of the thermal spray powder, the h-BN particles are preferably contained at 20 volume % or less with respect to the total volume of the thermal spray powder. Since h-BN is a material having solid lubricity like graphite, when the h-BN particles are contained in such a range, it is possible to further improve abradability of the thermal spray coating.

Here, when the synthetic mica particles are contained at 30 volume % or less and the h-BN particles are contained at 15 volume % or less with respect to the total volume of the thermal spray powder, as can be clearly understood from experiments conducted by the inventors to be described below, it is possible to ensure the strength of the formed thermal spray coating while maintaining abradability. Similarly, when the synthetic mica particles are contained at 20 volume % or less and the h-BN particles are contained at 20 volume % or less with respect to the total volume of the thermal spray powder, it is possible to ensure the strength of the formed thermal spray coating while maintaining abradability. Also, when proportions of synthetic mica particles and the h-BN particles are outside such a range, the strength of the thermal spray coating decreases and the thermal spray coating may be peeled off from the base material when the mating member comes in contact with the thermal spray coating.

As long as a thermal spray coating having a characteristic to be described below can be formed, the particle size of the h-BN particles is not particularly limited, and the particle size of the h-BN particles is preferably, for example, in a particle size range of 3 to 30 μm.

2. Method of Forming a Thermal Spray Coating 1 and Characteristics of the Thermal Spray Coating 1

A method of forming a thermal spray coating 1 and characteristics of the thermal spray coating 1 will be described below with reference to FIG. 2 and FIG. 3. FIG. 2 is a schematic conceptual diagram of the thermal spray coating 1 formed of the thermal spray powder 10 shown in FIG. 1. FIG. 3 is a diagram for describing behaviors of synthetic mica particles 12A of the thermal spray coating 1 when a mating member 4 comes in contact with the thermal spray coating 1 shown in FIG. 2.

Figure 2:
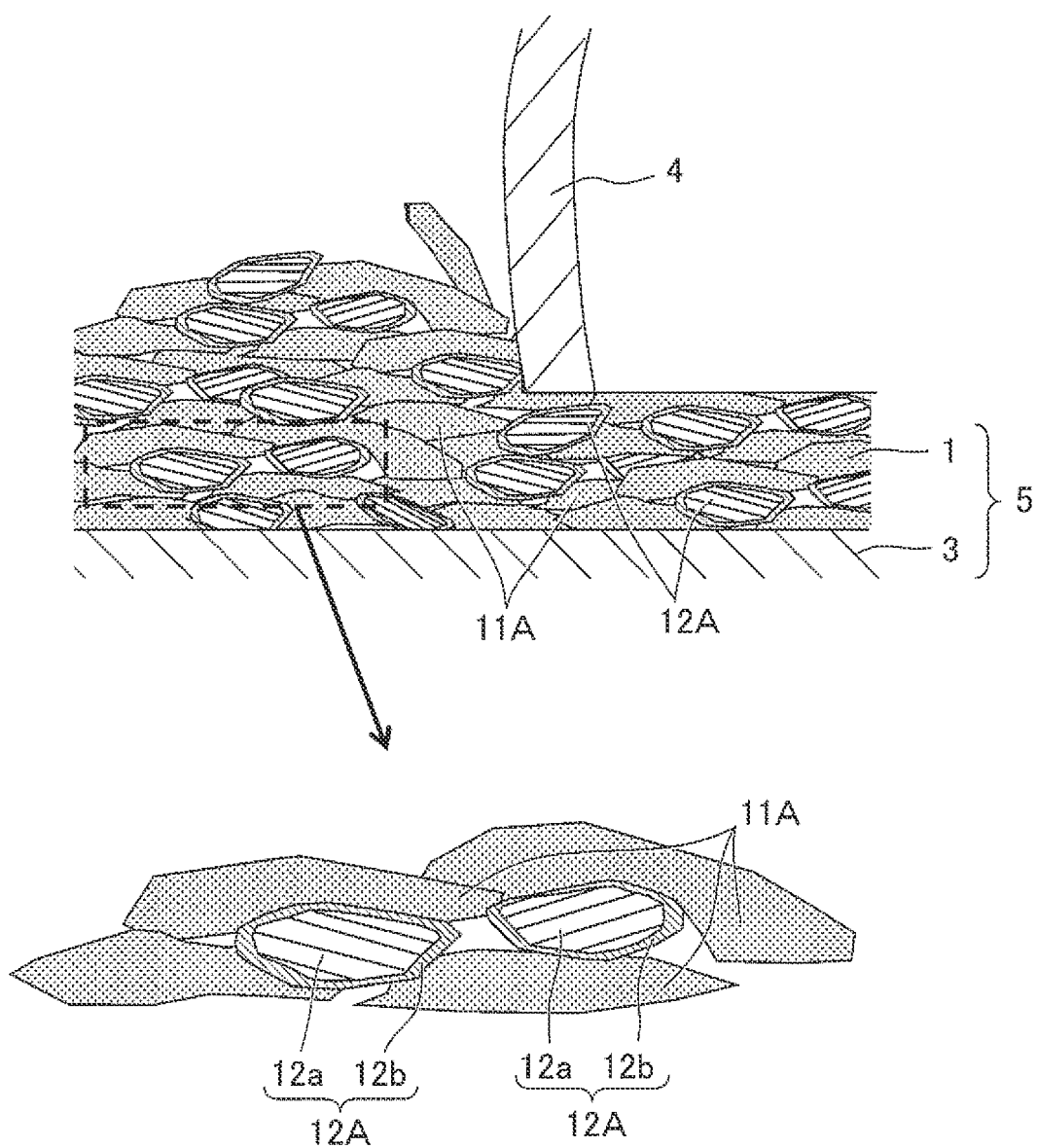
FIG. 2 is a schematic conceptual diagram of an abradable thermal spray coating formed of the thermal spray powders shown in FIG. 1.

In the present embodiment, the thermal spray powder 10 shown in FIG. 1 is input into a thermal spray device (not shown), and the thermal spray coating 1 is formed on a surface of a base material 3 such as a turbo housing of a turbocharger using the thermal spray powder 10 as shown in FIG. 2. When the thermal spray powder 10 is thermally sprayed, the thermal spray coating 1 is formed on the base material 3 while some of the synthetic mica particles 12 contained in the thermal spray powder 10 remain in a solid phase state.

The thermal spraying method is not particularly limited as long as some of the synthetic mica particles 12 can remain in a solid phase state. Preferable thermal spraying methods include a gas flame thermal spraying method through which it is possible to thermally spray the thermal spray powder 10 onto the base material 3 at lower temperatures than those of other thermal spraying methods such as plasma thermal spraying. In the gas flame thermal spraying method, when the thermal spray powder 10 is thermally sprayed, some of the synthetic mica particles 12 easily remain in a solid phase state when the thermal spray coating 1 is formed.

Also, as can be clearly understood from a determination test 1 to be described below, in the gas flame thermal spraying method, it is possible to form the thermal spray coating while some of the synthetic mica particles 12 remain in a solid phase state by adjusting the following conditions (1) to (4) when the thermal spray powder 10 is thermally sprayed.
(1) A supply flow rate of a combustion gas to be supplied (for example, a supply flow rate of $C_2H_2$ gas)
(2) An air pressure around the outer circumference of a nozzle for increasing a flow rate of a combustion gas
(3) A thermal spray distance between a base material and a thermal spray gun
(4) A supply rate of thermal spray powder As shown in FIG. 2, during the formation, on a surface of the base material 3, NiCr alloy particles 11A in which the NiCr alloy particles 11 of the thermal spray powder 10 are melted are deposited and synthetic mica particles 12A in which some of the synthetic mica particles 12 of the thermal spray powder 10 are melted are deposited, which form the thermal spray coating 1.

More specifically, during the formation, synthetic micas on the outermost surfaces of the synthetic mica particles 12 are melted, and then solidified, and form shells 12b, which are formed on surfaces of synthetic mica base materials 12a. As a result, as shown in FIG. 2, it is possible to weld the synthetic mica particles 12A to the NiCr alloy particles 11A and form the thermal spray coating 1 in which the synthetic mica particles 12A are interposed between the NiCr alloy particles 11A.

Here, as shown in FIG. 2, when the mating member (for example, a turbine wheel wing) 4 comes in contact with a thermal spray member 5 (for example, a turbo housing of a turbocharger) in which the thermal spray coating 1 is formed on the base material 3, the thermal spray coating 1 is scraped off by the mating member 4.

Figure 3:
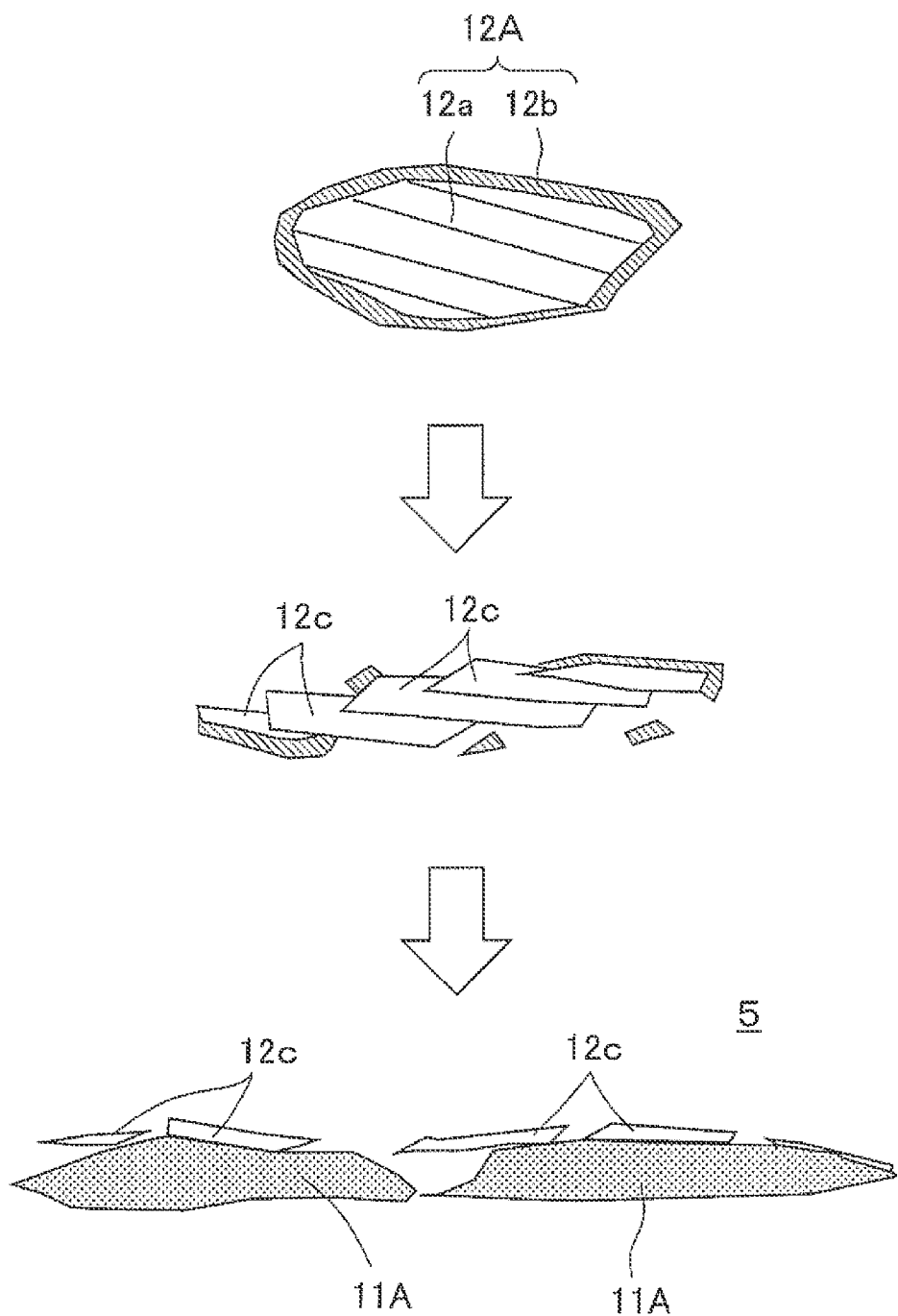
FIG. 3 is a diagram for describing behaviors of synthetic mica particles of the thermal spray coating when a mating member comes in contact with the abradable thermal spray coating shown in FIG. 2.

In this case, as shown in FIG. 3, the shells 12b are crushed together with the synthetic mica base material 12a of the synthetic mica particles 12A. Since the synthetic mica base material 12a is a material having cleavability, it becomes scaly synthetic mica particles 12c when crushed, and the synthetic mica particles 12c spread like a lubricant on a surface in contact with the mating member 4. Therefore, even if the mating member 4 comes further in contact with the thermal spray coating 1, since the scaly synthetic mica particles 12c are interposed therebetween, it is possible to suppress adhesion wear of the mating member 4 facing the thermal spray coating 1.

[Determination Test 1]

First, according to the following Reference Examples 1-1 to 1-7 and Reference Examples 2-1 and 2-2, the following determination test was performed and conditions for forming a thermal spray coating using a thermal spray powder were then determined. Specifically, a gas flame thermal spray device (TERO-DYN3000 commercially available from Castolin Eutectic) was used, and the following thermal spray powder was thermally sprayed on a surface of a base material (JIS standard: S45C) having a width of 25 mm, a length of 50 mm, and a thickness of 6 mm to form a thermal spray coating.

Here, as the thermal spray powder, the following thermal spray powders A and B were prepared. Specifically, for NiCr alloy particles of both of the thermal spray powders A and B, particles classified as having particle sizes of 125 μm or less and including a Ni-20Cr alloy (including Cr at 20 mass % and the balance of Ni and inevitable impurities) were prepared.

In the thermal spray powder A, fluorine phlogopite ($KMg_3AlSi_3O_{10}F_2$) classified as having an average particle size of 5 μm was used as the synthetic mica particles. Note that fluorine phlogopite has a melting point of 1375° C. In the thermal spray powder B, together with the NiCr alloy particles, K tetra silicic mica ($KMg_{2.5}Si_4O_{10}F_2$) classified as having an average particle size of 5 μm was used as the synthetic mica particles. Also, K tetra silicic mica ($KMg_{2.5}Si_4O_{10}F_2$) has a melting point of 1250° C.

Both of the thermal spray powders A and B were granulated from NiCr alloy particles and synthetic mica particles such that the synthetic mica particles of the thermal spray powders A and B were contained at 40 volume % with respect to a volume of a combination NiCr alloy particles and synthetic mica particles that is the total volume of the thermal spray powder.

In Reference Examples 1-1 to 1-7, the thermal spray powder A was used. In Reference Examples 2-1 and 2-2, the thermal spray powder B was used. In the reference examples, a thermal spray gun was provided such that a thermal spray distance between the base material and the thermal spray gun was 150 mm when a thermal spray coating was formed. Next, a mixed gas in which oxygen gas and $C_2H_2$ gas were mixed was supplied to the thermal spray gun, the gas was burned at a tip of the thermal spray gun to generate a flame, and the thermal spray powders A and B were supplied to the flame. Note that, as shown in Table 1, in the reference examples, during the formation, a supply flow rate of oxygen gas, a supply flow rate of $C_2H_2$ gas, and a supply rate of a thermal spray powder were adjusted.

Here, (1) a supply flow rate of $C_2H_2$ gas, (2) an air pressure around the outer circumference of a nozzle, (3) a thermal spray distance between the base material and the thermal spray gun, and (4) a supply rate of the thermal spray powder were closely related to a melting state of the thermal spray powder. Therefore, these values were set as the following indexes 1 to 4 according to a proportion of energy that was applied to the thermal spray powder from flame during thermal spraying.

The index 1 is an index set for the supply flow rate of $C_2H_2$ gas. The flame energy depends on the supply flow rate of $C_2H_2$ gas. As the supply flow rate increases, the flame energy increases, and the thermal spray powder is easily melted. The index 1 was set to 1 when the supply flow rate of $C_2H_2$ gas was 60 L/min. The index 1 was calculated based on the supply flow rate of $C_2H_2$ gas of the reference examples. The results are shown in Table 1.

The index 2 is an index set for the air pressure around the outer circumference of the nozzle. The flame energy depends on the air pressure around the outer circumference of the nozzle. As the air pressure increases, the burning temperature of the flame decreases and the thermal spray powder does not easily melt. The index 2 was set to 1 when the air pressure for press-feeding the thermal spray powder was 2.8 kg/cm². Since the air pressure was 2.8 kg/cm² in the reference examples, all of the indexes 2 were 1.

The index 3 is an index set for the thermal spray distance between the base material and the thermal spray gun. In the above-described gas flame thermal spray device, as the thermal spray distance between the base material and the thermal spray gun increases in a range of 100 to 200 mm, the time for which the thermal spray powder come in contact with the flame increases. Therefore, the thermal spray powder is easily melted. The index 3 was set to 1 when the thermal spray distance between the base material and the thermal spray gun was 200 mm and the index 3 was set to 0.85 when the thermal spray distance between the base material and the thermal spray gun was 150 mm. Since the thermal spray distance between the base material and the thermal spray gun was 150 mm in the reference examples, all of the indexes 3 were 0.85.

The index 4 is an index set for the supply rate of the thermal spray powder that was supplied to the flame. As the supply rate of the thermal spray powder decreases, the amount of the thermal spray powder that come in contact with the flame decreases and the thermal spray powder is easily melted. The index 4 was set to 1 when the supply rate of the thermal spray powder was 58 g/min. The index 4 was calculated by dividing the supply rates of the reference examples by the supply rate of 58 g/min. The results are shown in Table 1.

A value obtained by multiplying the set indexes 1 to 4 was set as a composite index. The results are shown in Table 1. The composite index is an index indicating the easiness of melting of a thermal spray powder during thermal spraying.

The Vickers hardnesses (Hv: 200 g) of the NiCr alloy particles of the thermal spray coatings of the reference examples were measured at five places and an average value thereof was set as the hardness (the coating hardness) of the thermal spray coating. The Vickers hardnesses (Hv: 5 g) of the synthetic mica particles (including melted particles) of the thermal spray coatings of the reference examples were measured at five places and an average value thereof was set as the hardness (mica hardness in coating) of the synthetic mica particles. The results are shown in Table 1.

Figure 4:
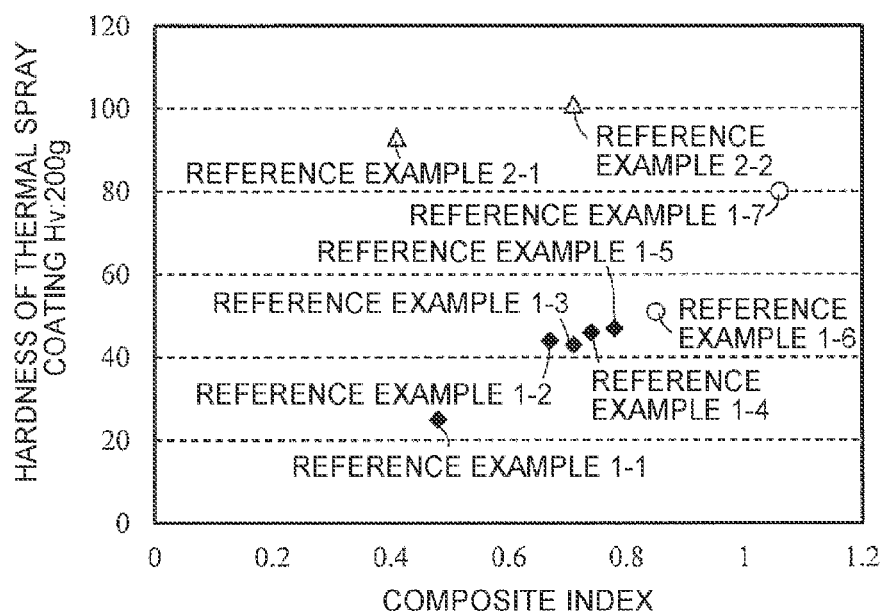
FIG. 4 is a graph showing relations between composite indexes and the hardnesses of the thermal spray coatings according to Reference Examples 1-1 to 1-7 and Reference Examples 2-1 and 2-2.
Figure 5:
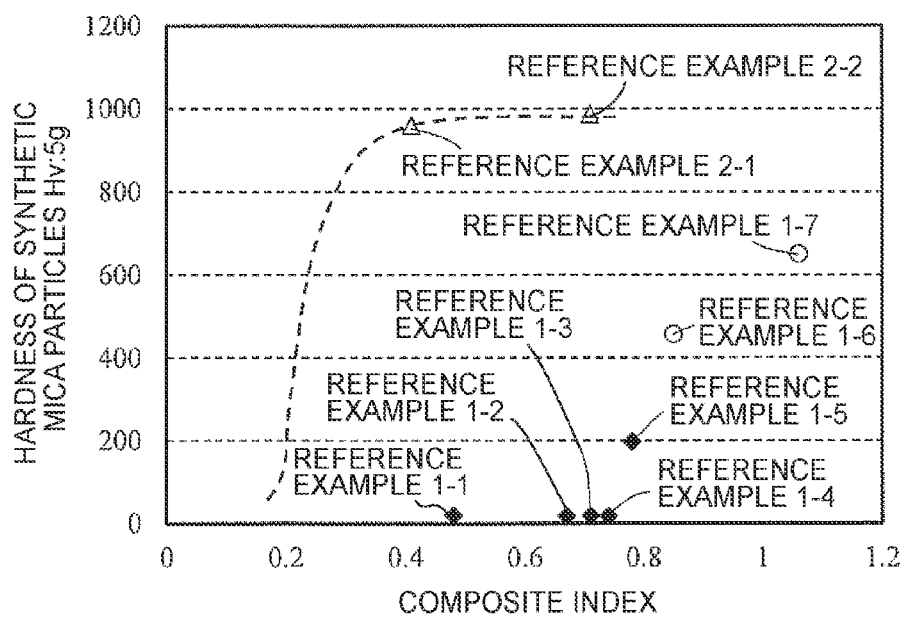
FIG. 5 is a graph showing relations between composite indexes and the hardnesses of synthetic mica particles according to Reference Examples 1-1 to 1-7 and Reference Examples 2-1 and 2-2.
Figure 6:
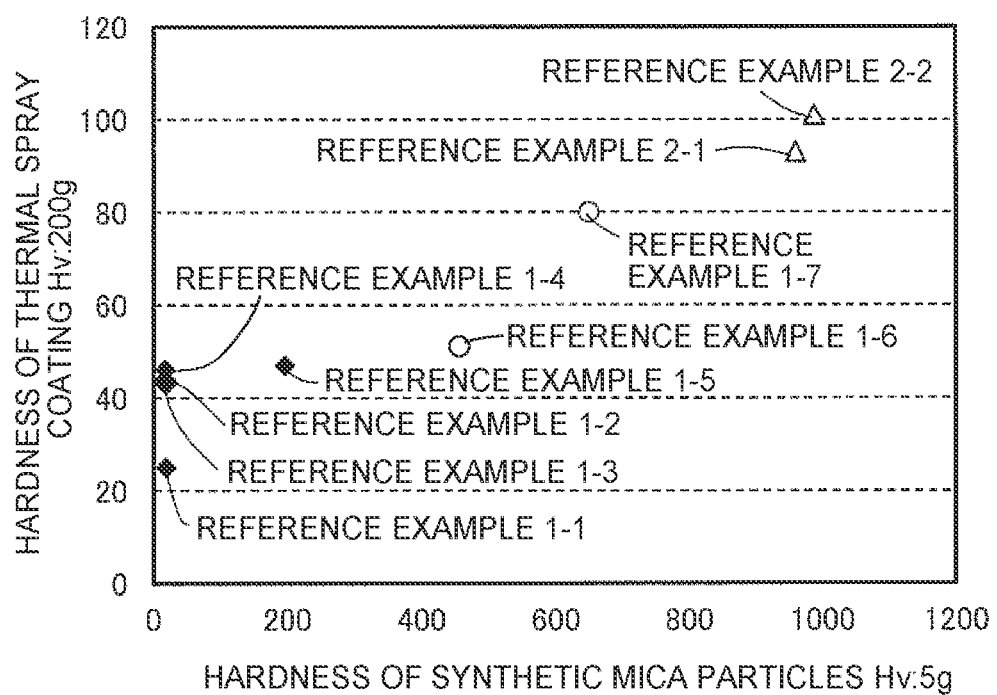
FIG. 6 is a graph showing relations between the hardness of the synthetic mica particles and the hardnesses of the thermal spray coatings according to Reference Examples 1-1 to 1-7 and Reference Examples 2-1 and 2-2.

FIG. 4 is a graph showing relations between the composite indexes and the hardnesses of the thermal spray coatings according to the reference examples. FIG. 5 is a graph showing relations between the composite indexes and the hardnesses of the synthetic mica particles according to the reference examples. FIG. 6 is a graph showing relations between the hardnesses of the synthetic mica particles and the hardnesses of the thermal spray coatings according to the reference examples.

Figure 7:
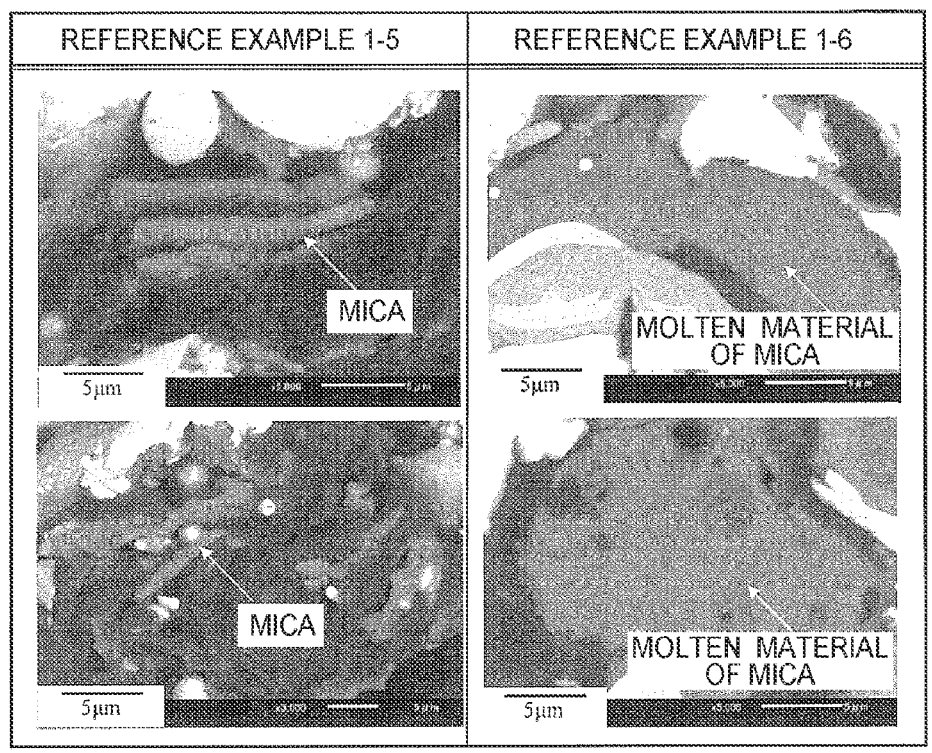
FIG. 7 shows cross-sectional photos of the thermal spray coatings according to Reference Example 1-5 and Reference Example 1-6.

Cross sections of the thermal spray coatings according to Reference Example 1-5 and Reference Example 1-6 were observed under a scanning electron microscope (SEM). FIG. 7 shows cross-sectional photos of the thermal spray coatings according to Reference Example 1-5 and Reference Example 1-6.

TABLE 1

| | Thermal spray powder | Gas Oxygen flow rate L/min | Gas $C_2H_2$ flow rate L/min | Index 1 | Gas pressure (air around outer circumference) kg/cm² | Index 2 | Thermal spray distance mm | Index 3 | Powder supply rate g/min | Index 4 | Composite index E | Coating hardness Hv0.2 | Mica hardness in coating Hv5 |
|---|---|---|---|---|---|---|---|---|---|---|---|---|---|
| Reference Example 1-1 | A | 25 | 45 | 0.75 | 2.8 | 1 | 150 | 0.85 | 77 | 0.75 | 0.48 | 25 | 19 |
| Reference Example 1-2 | A | 25 | 45 | 0.75 | 2.8 | 1 | 150 | 0.85 | 55 | 1.05 | 0.67 | 44 | 18 |
| Reference Example 1-3 | A | 30 | 50 | 0.83 | 2.8 | 1 | 150 | 0.85 | 58 | 1.00 | 0.71 | 43 | 19 |
| Reference Example 1-4 | A | 30 | 50 | 0.83 | 2.8 | 1 | 150 | 0.85 | 55 | 1.05 | 0.74 | 46 | 18 |
| Reference Example 1-5 | A | 40 | 55 | 0.92 | 2.8 | 1 | 150 | 0.85 | 58 | 1.00 | 0.78 | 47 | 197 |
| Reference Example 1-6 | A | 40 | 60 | 1.00 | 2.8 | 1 | 150 | 0.85 | 58 | 1.00 | 0.85 | 51 | 457 |
| Reference Example 1-7 | A | 40 | 75 | 1.25 | 2.8 | 1 | 150 | 0.85 | 58 | 1.00 | 1.06 | 80 | 650 |
| Reference Example 2-1 | B | 40 | 50 | 0.83 | 2.8 | 1 | 150 | 0.85 | 58 | 1.00 | 0.71 | 101 | 988 |
| Reference Example 2-2 | B | 40 | 45 | 0.75 | 2.8 | 1 | 150 | 0.85 | 89 | 0.65 | 0.41 | 93 | 960 |

(Results 1)

As shown in FIG. 4, the hardnesses of the thermal spray coatings of Reference Examples 1-6 and 1-7 whose composite indexes were greater than the composite indexes of Reference Examples 1-1 to 1-5 were greater than those of Reference Examples 1-1 to 1-5. The hardnesses of the thermal spray coatings of Reference Examples 2-1 and 2-2 were greater than those of Reference Examples 1-1 to 1-7.

As shown in FIG. 5, the hardnesses of the synthetic mica particles of Reference Examples 1-6 and 1-7 whose composite indexes were greater than the composite indexes of Reference Examples 1-1 to 1-5 were greater than those of Reference Examples 1-1 to 1-5. The hardnesses of the synthetic mica particles of Reference Examples 2-1 and 2-2 were greater than those of Reference Examples 1-1 to 1-7.

As shown in FIG. 6, as the hardness of the synthetic mica particles increased, the hardness of the thermal spray coating increased. As shown in FIG. 7, in the thermal spray coating of Reference Example 1-5, a scaly texture unique to synthetic mica particles remained and a cross section of the thermal spray coating was slightly porous. On the other hand, it can be understood that there was no scaly texture unique to synthetic mica particles but the synthetic mica was melted, solidified, and formed a dense mass in Reference Example 1-6.

It can be understood that the hardness of the thermal spray coating depends on the hardness of the synthetic mica particles based on the results in FIG. 6 and the synthetic mica particles were melted during the formation so that the hardnesses of Reference Examples 1-6 and 1-7 were greater than those of Reference Examples 1-1 to 1-5 based on the results in FIG. 7.

In addition, in Reference Examples 2-1 and 2-2, the synthetic mica particles contained in the thermal spray powder B were K tetra silicic mica. K tetra silicic mica has a melting point (1250° C.) that is lower than a melting point (1375° C.) of fluorine phlogopite contained in the thermal spray powder A used in Reference Examples 1-1 to 1-7. Therefore, in Reference Examples 2-1 and 2-2 whose composite indexes were lower than that of Reference Example 1-6 also, the synthetic mica particles were considered to be melted during the formation. As a result, it can be understood that the hardness of the (melted and solidified) synthetic mica particles and the hardnesses of the thermal spray coatings of Reference Examples 2-1 and 2-2 were greater than those of Reference Examples 1-1 to 1-5.

Based on the above findings, it can be understood that, when fluorine phlogopite having a high melting point is used for the synthetic mica particles of the thermal spray powder, a scaly texture of synthetic mica particles is likely to remain during the formation and the texture can prevent an increase in the hardness of the thermal spray coating. As a result, as will be described in the following examples, it can be understood that abradability can be imparted to a thermal spray coating more appropriately.

Also, in Reference Examples 2-1 and 2-2, K tetra silicic mica was used for the synthetic mica particles, but K tetra silicic mica has a melting point that is 125° C. lower than a melting point of fluorine phlogopite. Therefore, it can be understood that, when thermal spray conditions are determined so that the composite index becomes lower, for example, along the imaginary line (the dashed line) in FIG. 5, a scaly texture of synthetic mica particles can remain while the synthetic mica particles remain in a solid phase state even if K tetra silicic mica is used.

Examples of the present disclosure will be described based on the results of the above-described determination test.

EXAMPLE 1

Under conditions (refer to Table 1) shown in Reference Example 1-5 in the above-described determination test, a thermal spray test piece in which a thermal spray coating was formed on a surface of a base material was prepared. This example was different from that of the determination test 1 in that a thermal spray powder was granulated from NiCr alloy particles and synthetic mica (fluorine phlogopite) particles such that the synthetic mica particles were contained at 10 volume % or less with respect to the total volume of the thermal spray powder that was a volume of a combination of the NiCr alloy particles and the synthetic mica particles contained in the thermal spray powder. Also, 10 volume % of a content of the synthetic mica particles corresponded to 2.5 mass % with respect to the mass of the combination of the NiCr alloy particles and the synthetic mica particles contained in the thermal spray powder (the total mass of the thermal spray powder).

EXAMPLES 2 to 4

Thermal spray test pieces were prepared in the same manner as in Example 1. These examples were different from Example 1 in that, as shown in Table 2, contents of the synthetic mica particles were successively 20 volume %, 30 volume %, and 40 volume % with respect to a total volume of the thermal spray powder. Also, 20 volume %, 30 volume %, and 40 volume % of the contents of the synthetic mica particles corresponded successively to 3.5 mass %, 7.4 mass %, and 17.7 mass % with respect to the total mass of the thermal spray powder.

COMPARATIVE EXAMPLES 1 and 2

Thermal spray test pieces were prepared in the same manner as in Example 1. These examples were different from Example 1 in that, as shown in Table 2, no synthetic mica particles were contained (0 volume %) in Comparative Example 1 and a content of the synthetic mica particles was 50 volume % in Comparative Example 2.

COMPARATIVE EXAMPLES 3 to 5

Thermal spray coatings were formed in the same manner as in Example 1. These examples were different from Example 1 in that, as shown in Table 2, the h-BN particles were added in place of the synthetic mica particles and the h-BN particles were successively contained at 20 volume %, 25 volume %, and 30 volume % with respect to a volume of a combination of the NiCr alloy particles and the h-BN particles contained in the thermal spray powder (the total volume of the thermal spray powder).

COMPARATIVE EXAMPLE 6

A thermal spray coating was formed in the same manner as in Example 1. This example was different from Example 1 in that iron alloy particles of Ni: 13 mass %, Cr: 8 mass %, and the balance of Fe and inevitable impurities were used in place of the NiCr alloy particles, h-BN particles and Al particles were used in place of the synthetic mica particles, and the h-BN particles were contained at 19.2 volume % and the Al particles were contained at 8.8 volume % with respect to a total volume of a combination of the iron alloy particles, the h-BN particles, and the Al particles contained in the thermal spray powder (the total volume of the thermal spray powder).

[Machinability Test]

Figure 8:
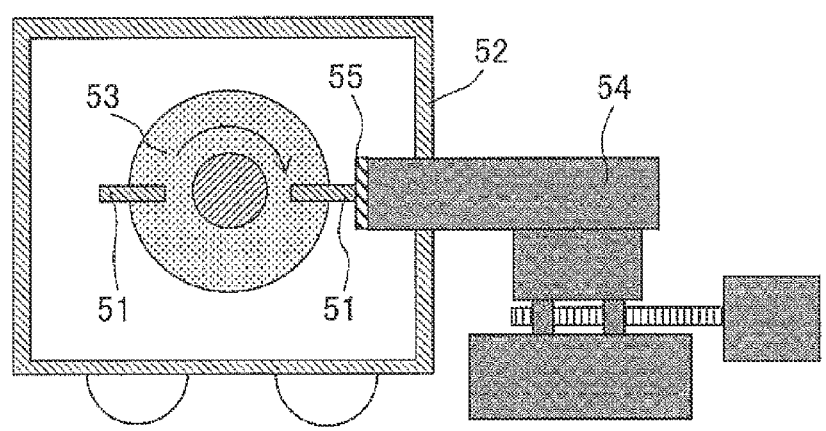
FIG. 8 is a schematic diagram of a machinability test device.

A machinability test was performed on the thermal spray test pieces of Examples 1 to 4 and Comparative Examples 1 to 6 using a machinability test device shown in FIG. 8. Specifically, as a mating member, a chip type test piece 51 made of the same material (Ni-13Cr-4Mo-2Nb-6Al-0.8Ti-0.1Zn-0.01B) as a turbine wheel of a vehicle turbocharger was prepared and two pieces were attached to a rotor 53 in an electric furnace 52. Next, while a thermal spray test piece 55 attached to a mobile device 54 was in contact with the chip type test piece 51, a position of the thermal spray test piece 55 was fixed. Next, a temperature inside the electric furnace 52 was increased to 500° C., a rotational speed of the rotor 53 was set to 1200 rpm, a feed rate of the chip type test piece 51 was set to 0.05 mm/sec, and the rotor 53 was rotated for 10 seconds.

Depths to which the thermal spray coatings of the thermal spray test pieces of Examples 1 to 4 and Comparative Examples 1 to 6 were scraped were measured using a micrometer. Wear amounts of the chip type test pieces of Examples 1 to 4 and Comparative Examples 1 to 6 were measured using an electronic balance. The results are shown in Table 2 and FIG. 9. Further, distributions of Mo in surfaces of the thermal spray coatings of Example 4 and Comparative Example 4 before and after the machinability test were measured using an EPMA. The results are shown in FIG. 10.

TABLE 2

| | Particles added | | | |
|---|---|---|---|---|
| | Content of synthetic mica particles (volume %) | Content of other particles (volume %) | Depth to which thermal spray test piece was scraped (mm) | Wear amount of chip type test piece (mg) |
| Comparative Example 1 | 0 | | 0.010 | −90 |
| Example 1 | 10 | | 0.056 | −75 |
| Example 2 | 20 | | 0.230 | −21 |
| Example 3 | 30 | | 0.312 | −14 |
| Example 4 | 40 | | 0.340 | −11 |
| Comparative Example 2 | 50 | | 0.120 (peeled off) | −13 (peeled off) |
| Comparative Example 3 | | 20 (h-BN) | 0.180 | −36 |
| Comparative Example 4 | | 25 (h-BN) | 0.250 | −29 |
| Comparative Example 5 | | 30 (h-BN) | 0.04 (peeled off) | −9 (peeled off) |
| Comparative Example 6 | | 19.2 (h-BN) 8.8 (Al) | 0.17 | −45 |

(Results 2)

Figure 9:
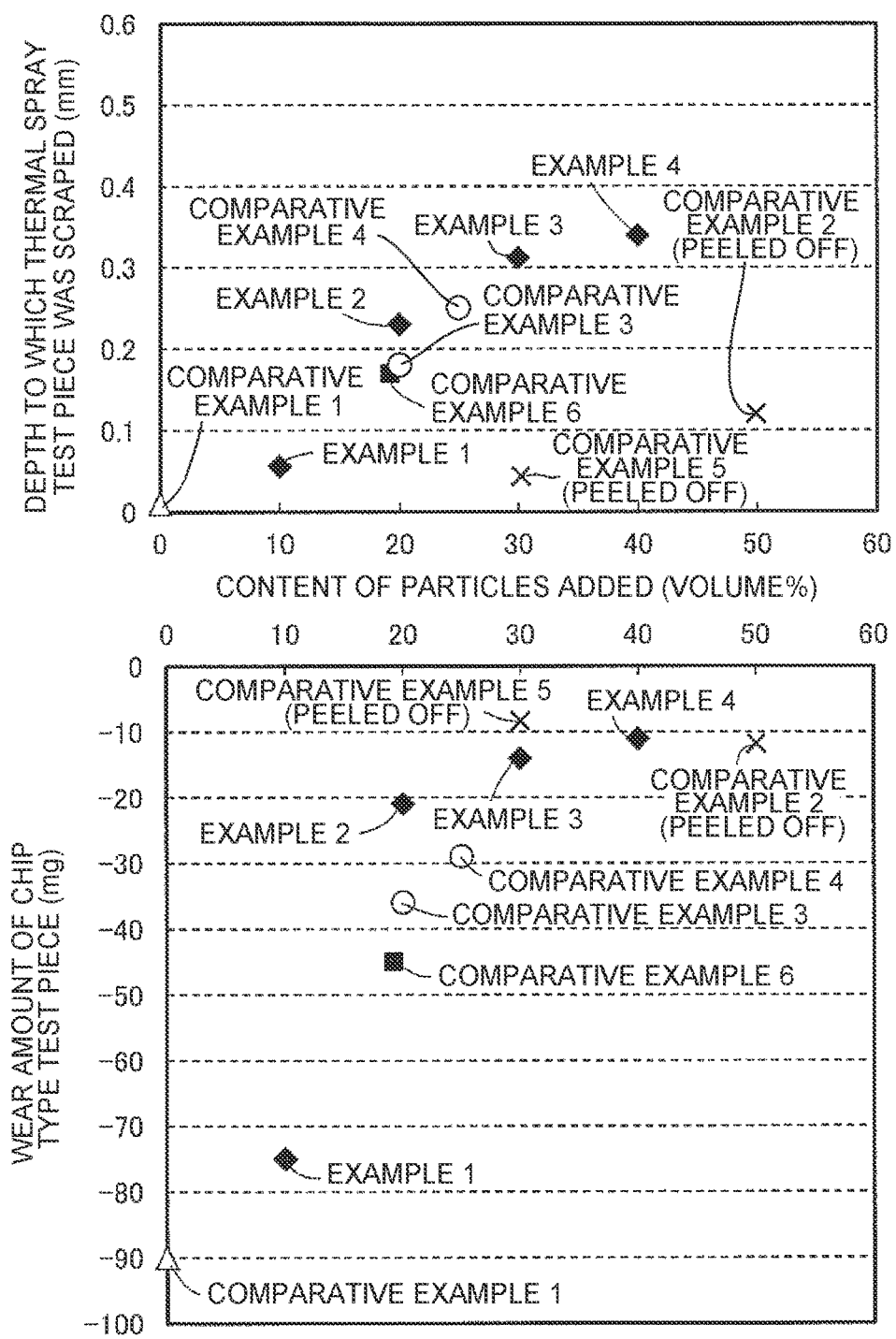
FIG. 9 shows diagrams of depths to which thermal spray test pieces are scraped and wear amounts of chip type test pieces according to Examples 1 to 4 and Comparative Examples 1 to 6.
Figure 10:
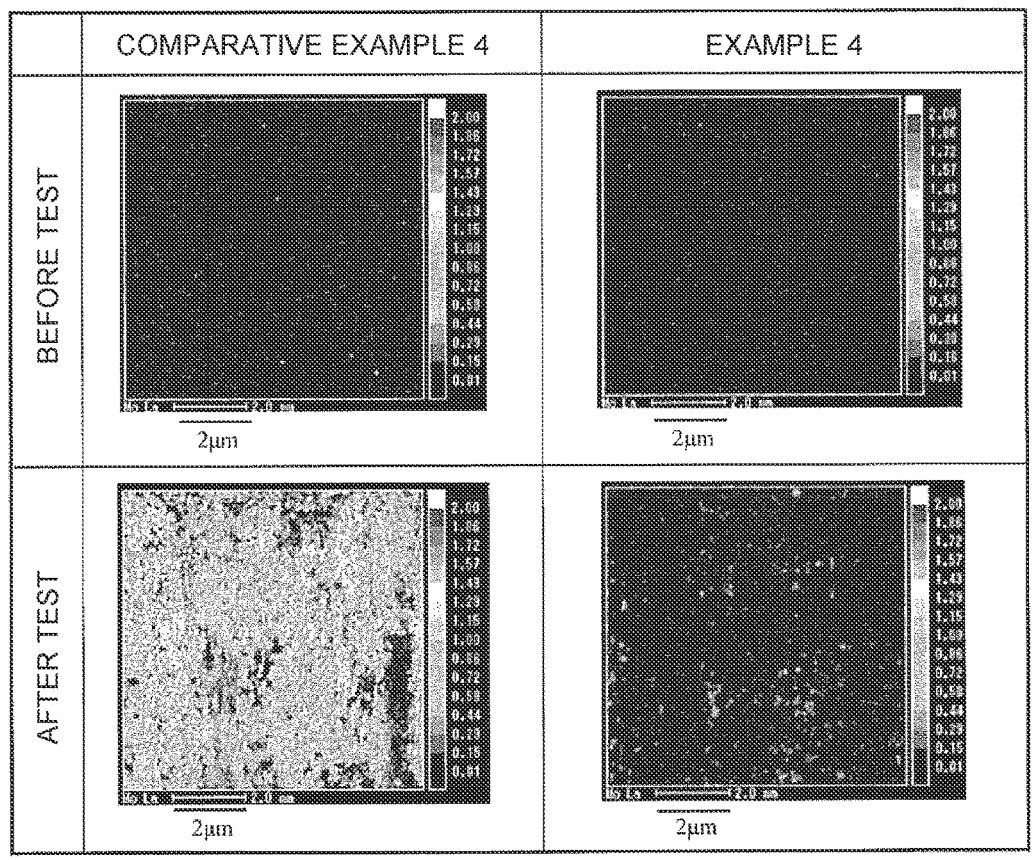
FIG. 10 is a diagram showing the results obtained by analyzing distributions of Mo in surfaces of the thermal spray test pieces according to Example 4 and Comparative Example 4 through EPMA analysis before and after a machinability test.

As shown in FIG. 9, the thermal spray test piece of Comparative Example 1 in which no synthetic mica particles were contained was hardly scraped off, and the wear amount of the chip type test piece was greater than those of Examples 1 to 4. Here, in Examples 1 to 4, since the thermal spray coating was formed under conditions of Reference Example 1-5 of the above-described determination test, the synthetic mica particles having cleavability (a scaly texture of mica) remained in the thermal spray coating. Therefore, in Examples 1 to 4, it can be understood that, when the thermal spray coating was scraped off, the synthetic mica particles having a scaly texture were crushed and became scaly and fine synthetic mica particles. As a result, as will be described below, in Examples 1 to 4, it can be understood that it is possible to suppress adhesion wear of the chip type test piece serving as a mating member while increasing machinability of the thermal spray coating of the thermal spray test piece.

In addition, in the thermal spray test piece of Comparative Example 2, the strength of the thermal spray coating was not sufficient and the thermal spray coating was peeled off during the machinability test. It can be understood that, as in Comparative Example 2, when the synthetic mica particles were contained at 50 volume %, since there were too many of the synthetic mica particles with respect to the thermal spray coating, the strength of the thermal spray coating decreased. Accordingly, it can be understood that, when the synthetic mica particles were contained at 40 volume % or less with respect to the total volume of the thermal spray powder, it is possible to ensure the strength of the formed thermal spray coating.

In addition, comparing Example 1 and Comparative Example 1, it can be understood that, as in Example 1, when the synthetic mica particles were contained, since the wear amount of the chip type test piece decreased, such an effect can be exhibited by simply containing a small amount of the synthetic mica particles. Also, as shown in FIG. 9, in Examples 2 to 4, the wear amounts of the chip type test piece were stable and small. Accordingly, the synthetic mica particles may preferably be contained at 20 volume % or more with respect to the total volume of the thermal spray powder.

Further, as shown in FIG. 9, the wear amounts of the chip type test pieces of Comparative Examples 3 and 6 in which the same amount of h-BN particles as in Example 2 were contained in place of the synthetic mica particles were greater than that of Example 2. In addition, as shown in FIG. 10, Mo was adhered to the thermal spray coating of Comparative Example 4 after the test, but Mo was hardly adhered to the thermal spray coating of Example 4 after the test.

Accordingly, it can be understood that Mo, a component of the chip type test piece, was adhered to the thermal spray coatings of Comparative Examples 3, 4 and 6 and the wear amounts of the chip type test pieces of Comparative Examples 3, 4, and 6 were greater than that of the chip type test piece of Example 2 due to adhesion wear. As in Examples 1 to 4, it can be understood that, by containing the synthetic mica particles of the thermal spray coating, when the thermal spray coating was scraped off, the synthetic mica particles having a scaly texture became fine and scaly synthetic mica particles and spread on a surface, which acted like a lubricant, and thus adhesion wear of the chip type test piece was suppressed.

Further, in the thermal spray test piece of Comparative Example 5, the strength of the thermal spray coating was not sufficient, and the thermal spray coating was peeled off during the machinability test. It can be understood that, as in Comparative Example 5, when the h-BN particles were contained at 30 volume %, since a content of the h-BN particles was too great with respect to the thermal spray coating, the strength of the thermal spray coating decreased. Here, as described above, in Example 4, despite the content of the synthetic mica particles being 40 volume % (exceeding 30 volume %), the strength of the thermal spray coating was ensured. It can be understood that, during thermal spraying, outer circumference parts of the synthetic mica particles were melted and welded to the NiCr alloy particles, and the synthetic mica particles supported the NiCr alloy particles. On the other hand, since h-BN sublimates without melting, the h-BN particles were not able to support the NiCr alloy particles as the synthetic mica particles did. Therefore, even if the content of the synthetic mica particles is greater than the content of the h-BN particles, it is possible to ensure the strength of the thermal spray coating.

EXAMPLES 1-1 to 1-5

Thermal spray test pieces in which a thermal spray coating was formed on a surface of a base material were prepared in the same manner as in Example 1. Example 1-1 was the same as Example 1. Examples 1-2 to 1-5 were different from Example 1 in that h-BN particles classified as having an average particle size of 5 μm were additionally contained in the thermal spray powder. Specifically, as shown in Table 3, in Examples 1-2 to 1-5, the h-BN particles were successively contained at 5 volume %, 10 volume %, 15 volume %, and 20 volume % with respect to a volume of a combination of the NiCr alloy particles, the synthetic mica particles, and the h-BN particles that was the total volume of the thermal spray powder. Also, 5 volume %, 10 volume %, 15 volume %, and 20 volume % of the content of the h-BN particles corresponded successively to 1.5 mass %, 3.3 mass %, 4.9 mass %, and 6.9 mass % with respect to the total mass of the thermal spray powder.

COMPARATIVE EXAMPLE 1-1

A thermal spray test piece in which a thermal spray coating was formed on a surface of a base material was prepared in the same manner as in Example 1-1. Comparative Example 1-1 was different from Example 1-1 in that h-BN particles classified as having an average particle size of 5 μm were additionally contained in the thermal spray powder. Specifically, as shown in Table 3, in Comparative Example 1-1, the h-BN particles were contained at 25 volume % with respect to the total volume of the thermal spray powder.

EXAMPLES 2-1 to 2-5

Thermal spray test pieces in which a thermal spray coating was formed on a surface of a base material were prepared in the same manner as in Example 2. Example 2-1 was the same as Example 2. Examples 2-2 to 2-5 were different from Example 2 in that h-BN particles classified as having an average particle size of 5 μm were additionally contained in the thermal spray powder. Specifically, as shown in Table 3, in Examples 2-2 to 2-5, the h-BN particles were contained successively at 5 volume %, 10 volume %, 15 volume %, and 20 volume % with respect to the total volume of the thermal spray powder. Also, 5 volume %, 10 volume %, 15 volume % and 20 volume % of the content of the h-BN particles corresponded successively to 1.6 mass %, 3.4 mass %, 5.4 mass %, and 7.5 mass % with respect to the total mass of the thermal spray powder.

COMPARATIVE EXAMPLE 2-1

A thermal spray test piece in which a thermal spray coating was formed on a surface of a base material was prepared in the same manner as in Example 2-1. Comparative Example 2-1 was different from Example 2-1 in that h-BN particles classified as having an average particle size of 5 μm were additionally contained in the thermal spray powder. Specifically, as shown in Table 3, in Comparative Example 2-1, the h-BN particles were contained at 25 volume % with respect to the total volume of the thermal spray powder.

EXAMPLES 3-1 to 3-4

Thermal spray test pieces in which a thermal spray coating was formed on a surface of a base material were prepared in the same manner as in Example 3. Example 3-1 was the same as Example 3. Examples 3-2 to 3-4 were different from Example 3 in that h-BN particles classified as having an average particle size of 5 μm were additionally contained in the thermal spray powder. Specifically, as shown in Table 3, in Examples 3-2 to 3-4, the h-BN particles were successively contained at 5 volume %, 10 volume %, and 15 volume % with respect to the total volume of the thermal spray powder. Also, 5 volume %, 10 volume %, and 15 volume % of the content of the h-BN particles corresponded successively to 1.8 mass %, 3.7 mass %, and 5.9 mass % with respect to the total mass of the thermal spray powder.

COMPARATIVE EXAMPLES 3-1 and 3-2

Thermal spray test pieces in which a thermal spray coating was formed on a surface of a base material were prepared in the same manner as in Example 3-1. Comparative Examples 3-1 and 3-2 were different from Example 3-1 in that h-BN particles classified as having an average particle size of 5 μm were additionally contained in the thermal spray powder. Specifically, as shown in Table 3, in Comparative Example 3-1 and Comparative Example 3-2, the h-BN particles were successively contained at 20 volume % and 25 volume % with respect to the total volume of the thermal spray powder.

[Machinability Test]

Similarly to Example 1, the machinability test was performed on the thermal spray test pieces of Examples 1-1 to 1-5, Comparative Example 1-1, Examples 2-1 to 2-5, Comparative Example 2-1, Examples 3-1 to 3-4, and Comparative Examples 3-1 and 3-2. The results are shown in Table 3 and FIG. 11. In addition, FIG. 11 also shows the results of Comparative Examples 3 and 4.

TABLE 3

|   | Content of synthetic mica particles (volume %) | Content of BN particles (volume %) | Depth to which thermal spray test piece was scraped (mm) | Wear amount of chip type test piece (mg) |
|---|---|---|---|---|
| Example 1-1 | 10 | 0 | 0.06 | −90 |
| Example 1-2 | 10 | 5 | 0.13 | −25 |
| Example 1-3 | 10 | 10 | 0.28 | −15 |
| Example 1-4 | 10 | 15 | 0.34 | −10 |
| Example 1-5 | 10 | 20 | 0.46 | −10 |
| Comparative Example 1-1 | 10 | 25 | peeled off | peeled off |
| Example 2-1 | 20 | 0 | 0.23 | −29 |
| Example 2-2 | 20 | 5 | 0.35 | −13 |
| Example 2-3 | 20 | 10 | 0.35 | −10 |
| Example 2-4 | 20 | 15 | 0.44 | −4 |
| Example 2-5 | 20 | 20 | 0.49 | −1 |
| Comparative Example 2-1 | 30 | 25 | peeled off | peeled off |
| Example 3-1 | 30 | 0 | 0.31 | −19 |
| Example 3-2 | 30 | 5 | 0.39 | −9 |
| Example 3-3 | 30 | 10 | 0.42 | −6 |
| Example 3-4 | 30 | 15 | 0.48 | −2 |
| Comparative Example 3-1 | 30 | 20 | peeled off | peeled off |
| Comparative Example 3-2 | 30 | 25 | peeled off | peeled off |

(Results 3)

Figure 11:
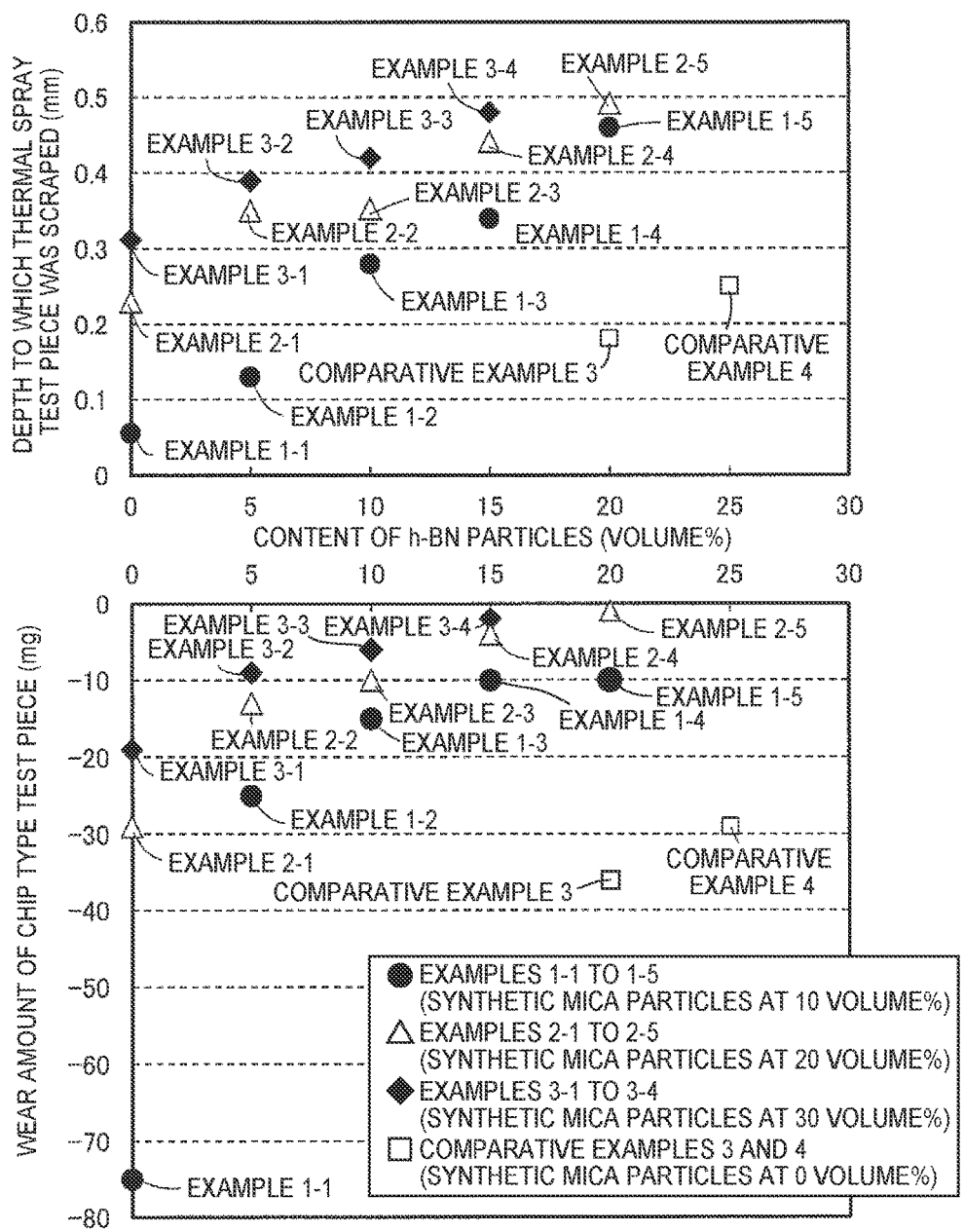
FIG. 11 shows diagrams of depths to which thermal spray test pieces are scraped and wear amounts of chip type test pieces according to Examples 1-1 to 1-5, Examples 2-1 to 2-5, Examples 3-1 to 3-4, and Comparative Examples 3 and 4.

As shown in FIG. 11, in Examples 1-1 to 1-5, Examples 2-1 to 2-5, and Examples 3-1 to 3-4 also, as the content of the h-BN particles increased, the depth to which the thermal spray test piece was scraped increased and the wear amount of the chip type test piece decreased. This is considered to be caused by the fact that h-BN in the h-BN particles is a material having solid lubricity like graphite.

In addition, as shown in Table 3, in the thermal spray test pieces of Comparative Example 1-1, Comparative Example 2-1, and Comparative Examples 3-1 and 3-2, the strength of the thermal spray coating was not sufficient, and the thermal spray coating was peeled off during the machinability test. It can be understood in these comparative examples that, since there were too many of the h-BN particles with respect to the thermal spray coating, the strength of the thermal spray coating decreased.

Therefore, as shown in FIG. 11 and Table 3, it can be understood from the determination based on the results of Examples 1-1 to 1-4, Examples 2-1 to 2-4, and Examples 3-1 to 3-4 that, when the synthetic mica particles are contained at 30 volume % or less and the h-BN particles are contained at 15 volume % or less with respect to the total volume of the thermal spray powder, it is possible to ensure the strength of the thermal spray coating to be formed. On the other hand, it can be understood from the determination based on the results of Examples 1-1 to 1-5 and Examples 2-1 to 2-5 that, when the synthetic mica particles are contained at 20 volume % or less and the h-BN particles are contained at 20 volume % or less with respect to the total volume of the thermal spray powder, it is possible to ensure the strength of the thermal spray coating to be formed.

Also, as shown in FIG. 11, all of the thermal spray coatings of Example 1-5, Example 2-5, and Comparative Example 3 contained the h-BN particles of the thermal spray powder at 20 volume %. However, it can be understood that, since the thermal spray test pieces of Example 1-5 and Example 2-5 contained the synthetic mica particles, the depth to which the thermal spray test piece was scraped was greater and the wear amount of the chip type test piece was lower than that of Comparative Example 3.

[Determination Test 2]

The following determination test 2 was performed on materials of the following Reference Examples 3-1 to 3-4 and Reference Examples 4-1 to 4-5, and thus a preferable composition of NiCr alloy particles used in Example 1 was determined.

REFERENCE EXAMPLES 3-1 to 3-4

In Reference Examples 3-1 to 3-4, as materials of the NiCr alloy particles, NiCr alloy materials including contents of Cr that were successively 10 mass %, 20 mass %, 30 mass %, and 50 mass %, and the balance of Ni and inevitable impurities were prepared.

REFERENCE EXAMPLES 4-1 to 4-5

In Reference Examples 4-1 to 4-5, as materials of NiCr alloy particles, NiCrAl alloy materials including contents of Al at 5 mass %, a content of Cr that was successively 9.5 mass %, 18 mass %, 19 mass %, 33.2 mass %, and 47.5 mass %, and the balance of Ni and inevitable impurities were prepared.

[High Temperature Oxidation Test]

The alloy materials of Reference Examples 3-1 to 3-4 and Reference Examples 4-1 to 4-5 were input into a heating furnace and heated at 850° C. for 120 hours under an oxygen gas atmosphere, and increased amounts of the alloy materials due to oxidation were measured. Note that the increased amounts due to oxidation are values that were obtained by dividing a difference between weights of the alloy materials before and after the test by surface areas of the alloy materials. The results are shown in FIG. 12.

[Hardness Test]

The Vickers hardnesses of the alloy materials of Reference Examples 3-1 to 3-4 and Reference Example 4-1 were measured under temperature conditions of 20° C., 500° C., and 850° C. Also, the Vickers hardness of the same material as the chip type test piece serving as a mating member was measured under temperature conditions of 20° C. and 500° C. as Reference Example 5. The results are shown in FIG. 13.

Figure 12:
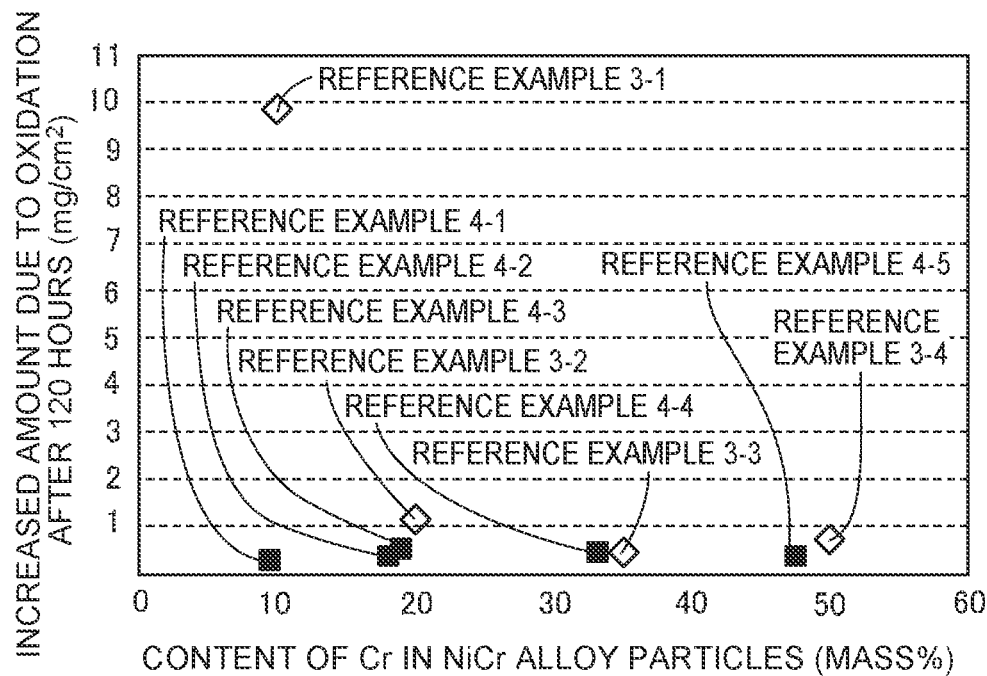
FIG. 12 is a diagram showing increased amounts of Cr due to oxidation in NiCr alloy materials according to Reference Examples 3-1 to 3-4 and Reference Examples 4-1 to 4-5 after 120 hours.

As shown in FIG. 12, the increased amount of the alloy material of Reference Example 3-1 due to oxidation was greater than those of the alloy materials of Reference Examples 3-2 to 3-4. Therefore, it can be understood that, if an amount of Cr contained in the NiCr alloy particles is in a range of 20 to 50 mass %, the NiCr alloy particles are hardly oxidized when the member is used during formation and after formation. On the other hand, in Reference Examples 4-1 to 4-5 in which Al was contained, regardless of a content of Cr, the increased amounts due to oxidation were small.

Figure 13:
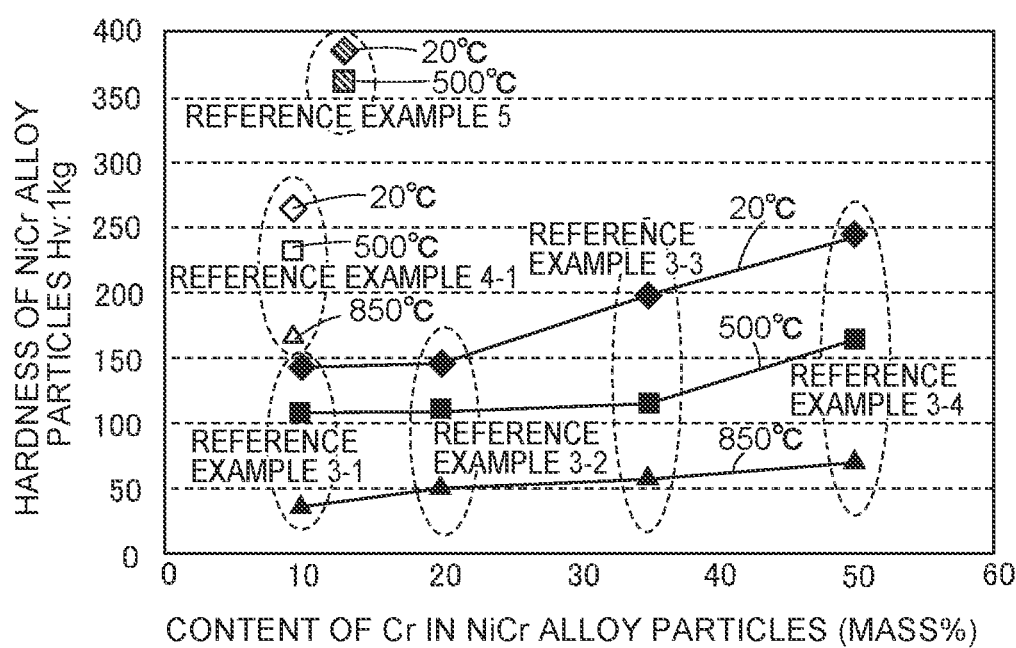
FIG. 13 is a diagram showing the hardnesses of NiCr alloy particles according to Reference Examples 3-1 to 3-4 and Reference Example 4-1.

As shown in FIG. 13, in Reference Examples 3-1 to 3-4, as a content of Cr increased, the Vickers hardness also increased. Since the hardnesses of the alloy materials of Reference Examples 3-1 to 3-4 and Reference Example 4-1 were lower than the Vickers hardness of the material of Reference Example 5 that was a material of the mating member, such alloy materials can be appropriately used for the NiCr alloy particles of the thermal spray powder. In addition, based on the results of changes in the Vickers hardnesses of the alloy materials of Reference Examples 3-1 to 3-4 at 500° C. and the hardness of the alloy material of Reference Example 4-1 at 500° C., it can be understood that the Vickers hardnesses of Reference Examples 4-2 to 4-5 were lower than that of the material (500° C.) of Reference Example 5.

While the embodiments have been described above in detail, specific configurations are not limited to the embodiments and design modifications without departing from the scope of the present disclosure may be included in the present disclosure.

What is claimed is:

1. A thermal spray powder for forming an abradable thermal spray coating, comprising:
   NiCr alloy particles;
   synthetic mica particles; and
   h-BN particles, wherein
   the synthetic mica particles are contained at 30 volume % or less with respect to a total volume of the thermal spray powder, and
   the h-BN particles are contained at 15 volume % or less with respect to the total volume of the thermal spray powder.

2. The thermal spray powder according to claim 1, wherein
   the synthetic mica particles are contained at 20 volume % or more with respect to the total volume of the thermal spray powder.

3. The thermal spray powder according to claim 1, wherein
   the synthetic mica particles are particles made of fluorine phlogopite.

4. The thermal spray powder according to claim 1, wherein
   the NiCr alloy particles contain Cr at 20 to 50 mass %.

5. The thermal spray powder according claim 1, wherein the NiCr alloy particles contain Al at 0.1 to 5 mass %.

6. An abradable thermal spray coating, comprising:
   NiCr alloy particles;
   synthetic mica particles; and
   h-BN particles, wherein
   the synthetic mica particles are contained at 40 volume % or less with respect to a total volume of powders contained in the abradable thermal spray coating, and the h-BN particles are contained at 15 volume % or less with respect to the total volume of the thermal spray powder.

7. The abradable thermal spray coating according to claim 6, wherein
the synthetic mica particles are contained at 20 volume % or more with respect to the total volume of powders contained in the abradable thermal spray coating.

8. The abradable thermal spray coating according to claim 6, wherein
the synthetic mica particles include shells on surfaces of the synthetic mica particles, the shells being formed by a solidification of melted synthetic mica particles.

9. The thermal spray powder according to claim 1, wherein
the synthetic mica particles are contained at 10 volume % or more with respect to the total volume of the thermal spray powder, and the h-BN particles are contained at 5 volume % or more with respect to the total volume of the thermal spray powder.

10. The abradable thermal spray coating according to claim 6, wherein
the synthetic mica particles are contained at 10 volume % or more with respect to the total volume of the thermal spray powder, and the h-BN particles are contained at 5 volume % or more with respect to the total volume of the thermal spray powder.

11. A method of forming an abradable thermal spray coating using the thermal spray powder according to claim 1, comprising:
forming the abradable thermal spray coating while some of the synthetic mica particles contained in the thermal spray powder remain in a solid phase state.

12. The forming method according to claim 11, wherein
forming of the abradable thermal spray coating using the thermal spray powder is performed by gas flame thermal spraying.

13. The forming method according to claim 12, wherein
at least one of conditions including (i) a supply flow rate of a combustion gas supplied to a thermal spray gun, (ii) an air pressure of air supplied to the thermal spray gun, (iii) a thermal spray distance between a base material on which the abradable thermal spray coating is formed and the thermal spray gun, and (iv) a supply rate of the thermal spray powder to the base material is adjusted so that some of the synthetic mica particles remain in a solid phase state.

* * * * *